July 31, 1956  D. W. LEWIS  2,756,555
LAWN EDGER AND HEDGE TRIMMER
Filed Dec. 24, 1953  3 Sheets-Sheet 1
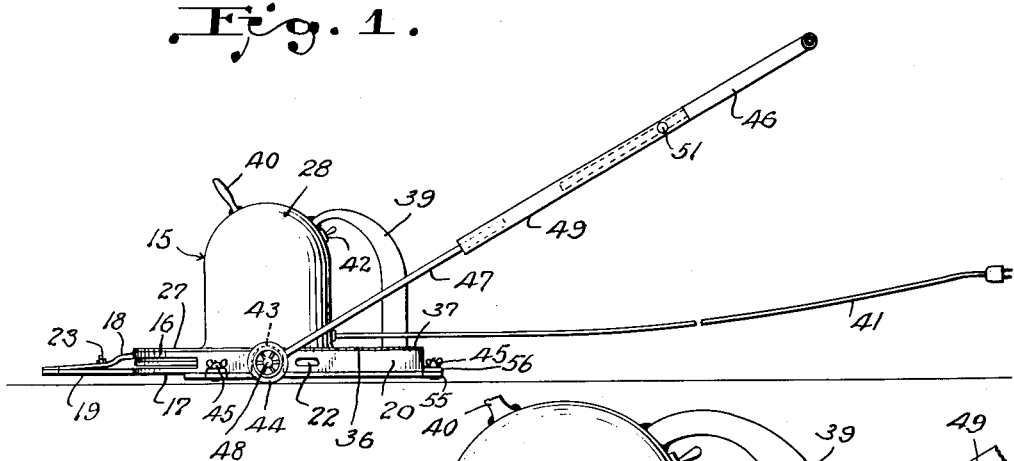
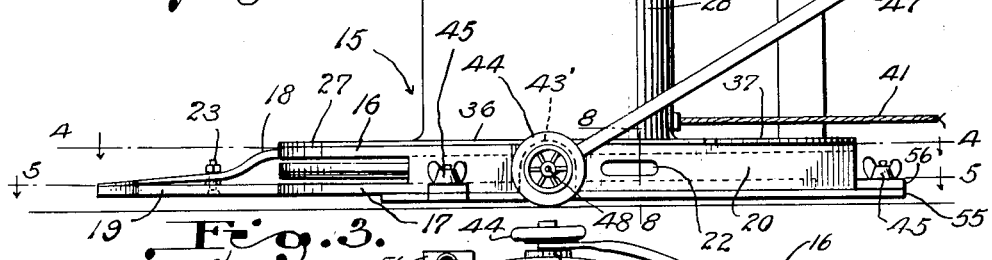
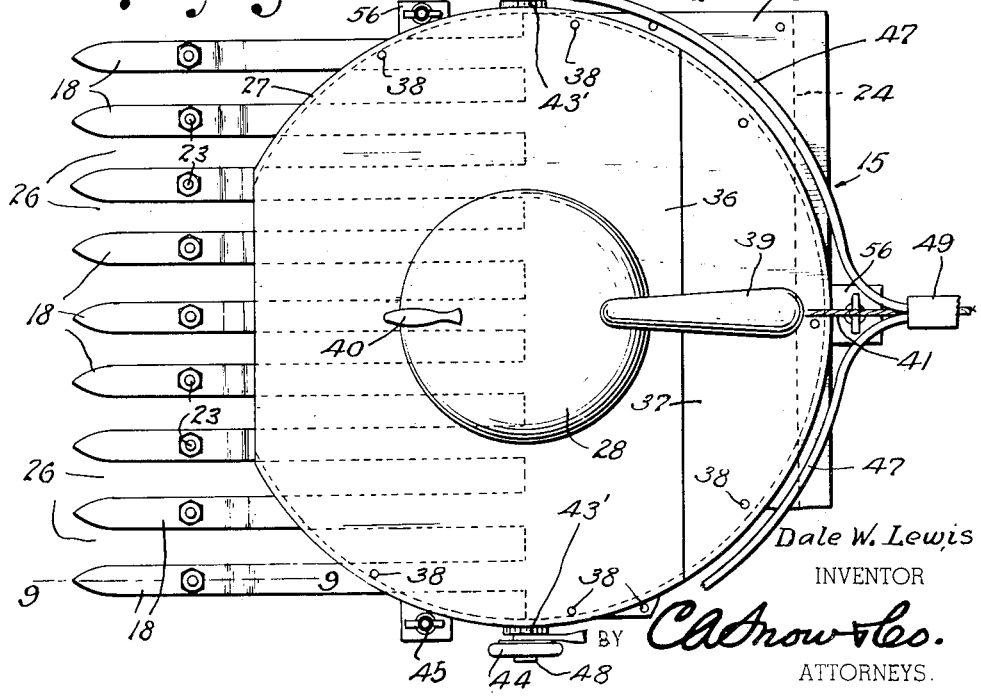
Dale W. Lewis
INVENTOR
BY
ATTORNEYS.

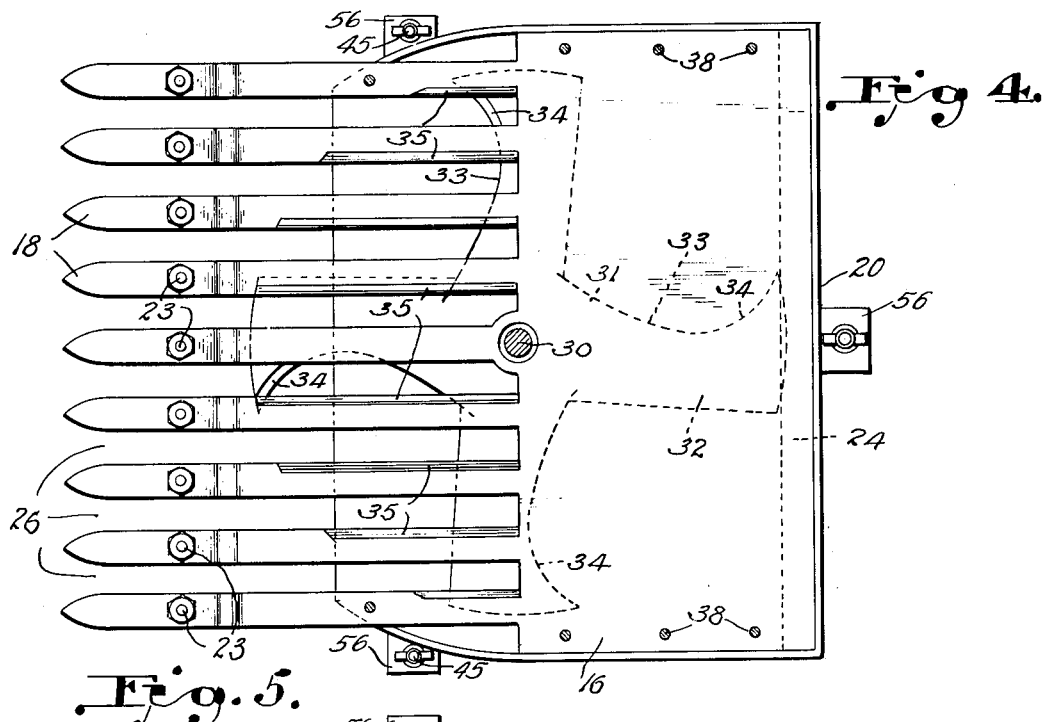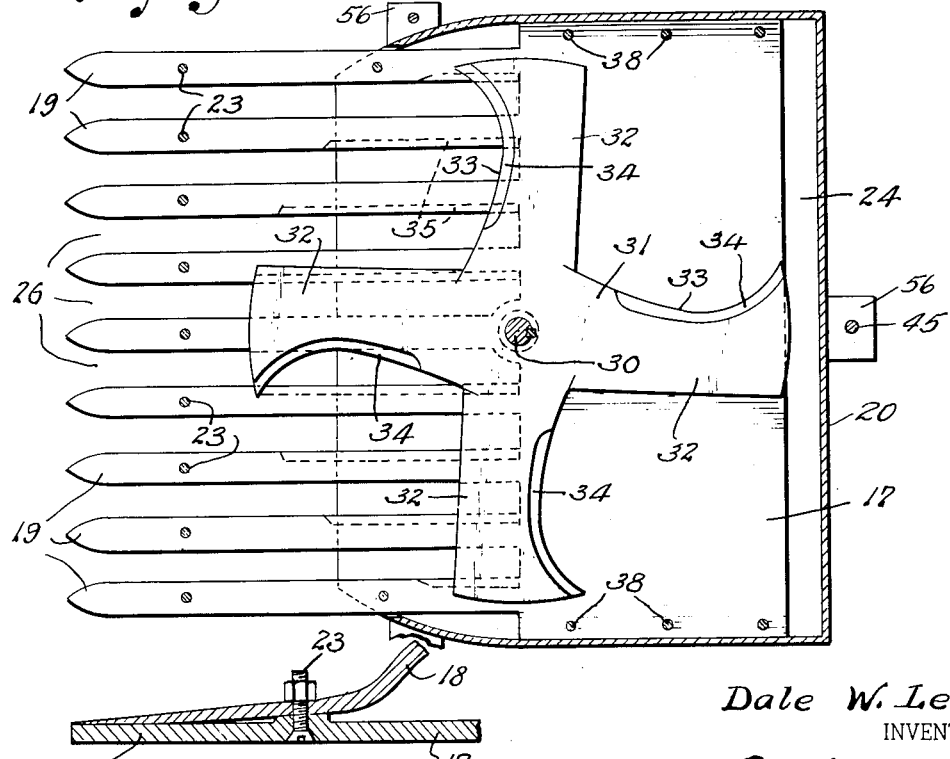

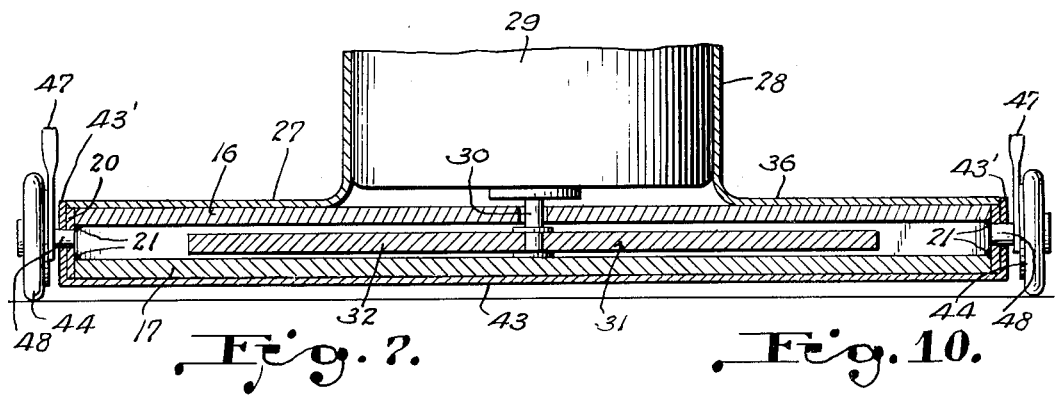
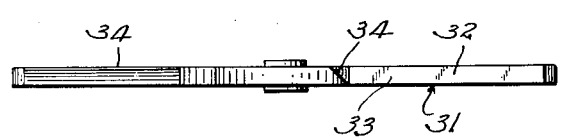
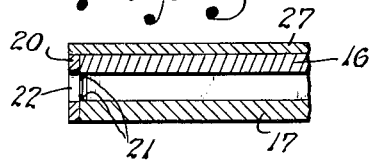
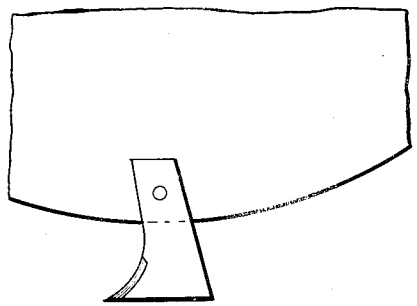
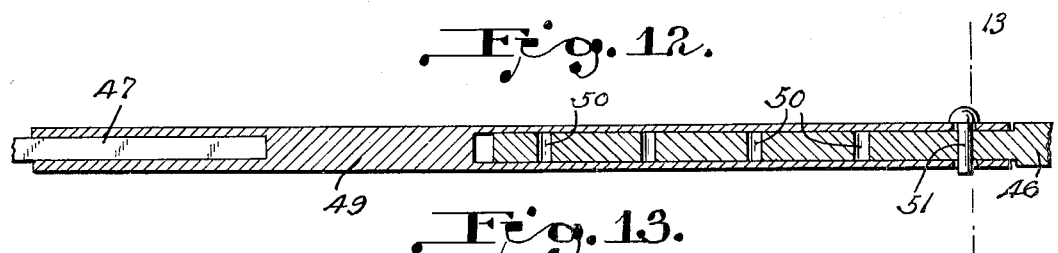
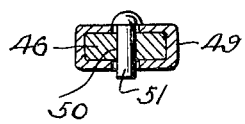
Dale W. Lewis
INVENTOR United States Patent Office 2,756,555
Patented July 31, 1956

2,756,555

LAWN EDGER AND HEDGE TRIMMER

Dale W. Lewis, East Liverpool, Ohio

Application December 24, 1953, Serial No. 400,169

1 Claim. (Cl. 56—25.4)

This invention relates to a hedge clipper and more particularly to a novel hedge clipper which may be easily and readily carried about by a person to clip a hedge at a desired height.

It is another object of this invention to provide a hedge clipper of the kind to be more particularly described hereinafter which may be constructed at an economical cost and which may easily be mounted on a wheeled cradle for cutting grass or shrubs when so desired.

It is a further object of this invention to provide a hedge clipper of this kind having an electric motor for a rotatable cutting blade with a switch on the motor housing for turning on and off the electric motor.

It is yet another object of this invention to provide a hedge clipper of this kind having a casting within which the rotary cutting blade is mounted and fingers on the casting between which the hedge or grass and shrubs may be gathered for cutting and a plate detachably secured on the casing which may be removed for cleaning the casting.

It is yet a further object of this invention to provide a hedge clipper of this kind to accurately hold the hedge or the grass in the outwardly extending fingers for gathering the hedge or grass to be cut by the rotating blade and sharp edge of the fingers without a tendency of the hedge or grass to slip from the fingers or away from the tool.

Other and further objects and advantages of the invention will be hereinafter described and the novel features thereof defined in the appended claim.

In the drawings:

Fig. 1 is a side elevation of a hedge clipper formed according to an embodiment of my invention.

Fig. 2 is an enlarged side elevation of the lower end of the hedge clipper shown in Fig. 1.

Fig. 3 is an enlarged top plan view.

Fig. 4 is a horizontal section taken on the line 4—4 of Fig. 2.

Fig. 5 is a horizontal section, partly broken away, taken on the line 5—5 of Fig. 2.

Fig. 6 is an enlarged front elevation, partly broken away and partly in section, of the hedge clipper.

Fig. 7 is an enlarged side elevation of a rotary cutting blade of my invention removed from the clipper.

Fig. 8 is a vertical section partly broken away, taken on line 8—8 of Fig. 2.

Fig. 9 is an enlarged fragmentary detailed section taken on the line 9—9 of Fig. 3.

Fig. 10 is a fragmentary bottom plan view of a modified form of rotary cutter, partly broken away.

Fig. 11 is a side elevation, partly broken away of the modified cutting blade.

Fig. 12 is an enlarged fragmentary longitudinal section of the adjustable handle on the clipper.

Fig. 13 is a transverse section taken on the line 13—13 of Fig. 12.

Referring to the drawings the numeral 15 designates generally a clipper constructed according to an embodiment of my invention.

The clipper 15 is formed with an upper cast plate 16 and a lower cast plate 17.

The upper cast plate 16 is provided with downwardly inclined fingers 18 on one side thereof and the lower plate 17 is provided with horizontally flat fingers 19 extending forward therefrom below the inclined fingers 18. A plurality of fingers, depending upon the sizes of the plates 16 and 17, may be provided in the castings of the respective plates.

A band 20 is disposed about the clipper 15 between the plates 16 and 17 and is secured thereto by welds 21 for connecting the band 20 to the flat plates 16 and 17.

The band 20 is provided with an opening 22 on the sides of the clipper 15 through which the clippings from the grass or hedge may be disposed outwardly from the clipper.

Bolts 23 extend between the fingers 18 and 19 for securing the fingers together so that the fingers may gather into the clipper the hedge or grass to be cut.

The lower cast plate 17 is shorter than the upper cast plate 16 so that when the band 20 is secured between the plates an opening 24 through the lower casting plate 17 is provided also for the discharge of the cut material from the clipper.

As the fingers 18 and 19 extend forwardly of the clipper 15 a space 26 is provided between the adjacent fingers both in the upper and lower plates. Such space between the fingers will provide for the easy gathering of the material to be severed or cut by the rotating blade in the clipper, to be described more particularly hereinafter.

A cover plate 27 is secured to the upper side of the upper cast plate 16 and is provided with an upwardly extending, downwardly opening housing 28 within which an electric motor 29 is disposed.

The electric motor 29 is provided with a downwardly extending motor shaft 30 onto which a rotary cutter 31 is compressingly secured, the rotary cutter 31 being disposed between the upper and lower cast plates as clearly shown in the drawings.

The rotary cutter 31 is formed as a disc 32 having cutout portions 33 spaced apart along the periphery thereof and each of the cutouts 33 has a cutting edge 34 for cutting the material between the cutting edge 34 and the fixed cutting edge of the teeth 35 when the material to be cut is gathered by the teeth.

The cover plate 27 is formed of a forward cover section 36 which is secured to the clipper and a removable rear cover section 37 which is secured to the clipper 15 at the rear of motor 29.

The bolts 38 are extended through the upper and lower cast plates 16 and 17 and also through the cover plates 36 and 37 so that the clipper 15 may be partially dismantled for cleaning out the clipper.

A looped handle 39 is carried by the clipper 15 having one end of the looped handle 39 connected to the cover plate 37 and the other end of the looped handle connected to the housing 28. In Fig. 10 there is disclosed a modified form of cutter embodying a disc-shaped carrier or plate 52 having blades 53 secured to the lower side thereof, as by fastening elements 54. The handle 39 is secured to housing 28 and to plate 37 and by removing plates 36 and 37 the housing 28 may be removed.

In the use and operation of the clipper 15 for clipping hedges and the like, the clipper 15 is connected by an electric cord 41 having an electric switch 42 in the housing 28 so that the operator of the clipper 15 may cause the rotatable cutter 31 to be in operation or disconnected from the source of electricity.

In the above described form of the invention, the clipper 15 may be used as a hedge clipper to be carried about in the hands of an operator. One hand or fist of the operator is engaged with the looped handle 39 and the other hand of the operator is grasped about the post handle 40 for the easy manipulation of the clipper 15 as a hedge clipper.

When it is desired to use the clipper 15 as a grass clipper or the like, a cradle 43 including vertical lugs 43' having ground engaging wheels 44 supported thereby may be releasably connected to the clipper.

A resilient disconnectable fastening means may be secured on the cradle, on the opposite sides thereof and a portion of the cradle 43 may be disposed about the band 20.

The cradle 43 is formed with ears 55 and the band 20 is formed with confronting ears 56 through which the wing bolts 45 engage to hold the cradle 43 against the bottom of plate 17.

A handle 46 is detachably connected to the cradle 43 and a yoke 47 is connected to the axles 48 for the wheels 44.

The yoke 47 is provided with an outwardly extending arm 49, intermediate the length thereof, for attachment of the handle 46 thereto.

The handle 46 is tubular and rectangular in transverse section as shown in Fig. 13, and the handle 46 is slidably engageable within the arm or sleeve 49.

The lower end of the handle 46 is provided with transversely extending bores or holes 50 therethrough for engagement with a bolt 51.

The handle 46 may be slid into the sleeve 49 to a selected desired position and then the bolt 51 slid into place transversely of the sleeve 49 and the cylindrical portion of the handle 46.

In the use and operation of the clipper 15 as a grass cutter or the like, the clipper 15 may be propelled about the surface of the earth by way of the handle 46 with the wheels 44 in engagement with the ground. Otherwise the structure, use and operation of the clipper 15 would be the same as that described above without the necessity of the handles 39 and 40.

While the specific details of one embodiment of this invention have been herein shown and described, the invention is not confined thereto as changes and alterations may be made without departing from the spirit and scope thereof as defined in the appended claims.

I claim:

A lawn edger or hedge clipper comprising a pair of spaced apart horizontal plates, forwardly projecting parallel horizontal fingers carried by the lower one of said plates, forwardly and downwardly projecting parallel fingers carried by the upper one of said plates, bolts securing said fingers together, a power member secured to the upper plate, a drive shaft extending downwardly from said power member through said upper plate, a cutter fixed to said shaft and disposed between said plates, a band fixed about the side and rear edges of said plates, said band having ears extending from the sides and rear thereof, a bottom plate, ears extending from said bottom plate confronting said first named ears, means removably securing said ears together, a pair of vertical lugs carried by the opposite side edges of said bottom plate, stub shafts carried by said lugs, wheels rotatable on said stub shafts, an elongated handle, and a fork extending from said handle pivoted on said shafts.

References Cited in the file of this patent

UNITED STATES PATENTS

| | | |
|---|---|---|
| 844,414 | Seabloom | Feb. 19, 1907 |
| 1,426,989 | Janes et al. | Aug. 22, 1922 |
| 1,880,154 | Rotondo et al. | Sept. 27, 1932 |
| 2,091,827 | Mercatoris | Aug. 31, 1937 |
| 2,242,524 | Hunt | May 20, 1941 |
| 2,404,504 | Klose | July 23, 1946 |
| 2,527,472 | Wolf | Oct. 24, 1950 |
| 2,539,779 | Grosso | Jan. 30, 1951 |
| 2,648,187 | Ries | Aug. 11, 1953 |

FOREIGN PATENTS

| | | |
|---|---|---|
| 261,901 | Switzerland | Mar. 1, 1950 |